Patented Sept. 9, 1941

2,255,483

UNITED STATES PATENT OFFICE 2,255,483

INHIBITED POLYMERIZABLE UNSATURATED ORGANIC COMPOUND

Gaetano F. D'Alelio, Pittsfield, Mass., assignor to General Electric Company, a corporation of New York No Drawing. Application October 1, 1938, Serial No. 232,901

10 Claims. (Cl. 260—486)

This invention relates to polymerizable compositions, and more particularly to inhibiting against polymerization compositions which are polymerizable under the influence of heat, light or oxygen and which comprise a polymerizable (more particularly, monomeric) organic compound containing in its molecule the polymerizable grouping

The invention is especially concerned with liquid polymerizable organic compounds of the kind just stated in which is incorporated a member of the class consisting of ascorbic acid, isoascorbic acid, and mixtures of ascorbic and isoascorbic acids in an amount sufficient to inhibit the polymerization of the compound. The polymerized compositions which result from practicing this invention contain the decomposition product obtained by decomposing in situ, under the influence of heat, light or oxygen, the member of the class just described that was incorporated with the polymerizable material.

Such chemical bodies as hydroquinone, pyrogallol, copper salts and sulfur are used extensively as inhibitors of polymerization of monomeric organic compounds of the kind above mentioned, specific examples of which are styrene, vinyl esters (e. g., vinyl acetate), esters of acrylic acid (e. g., methyl acrylate), esters of alpha-substituted acrylic acids (e. g., methyl methacrylate), etc. These inhibitors possess the disadvantage that they must be removed from the polymerizable compound, either by distillation or extraction, before the compound is adapted for practical use. Pyrogallol and hydroquinone, although removable by distillation, usually are removed by extraction with dilute, aqueous solutions of alkalies such as sodium hydroxide, followed by washing with distilled water, and then drying. In either case the loss of polymerizable substance, the investment in equipment and the man hours used in such operations add substantially to the cost of articles made from monomeric materials inhibited in this way.

The ideal inhibitor would be a colorless or nearly colorless chemical that would exert an inhibiting effect for a reasonable period of time. As a further requirement, it should be adapted to be destroyed readily to a colorless or nearly colorless product that would not have to be removed. This destruction might be accomplished in situ by the addition of chemical bodies such as peroxides to be used as the polymerizing catalyst, or simply by heating under suitable time and temperature conditions.

I have discovered that ascorbic and isoascorbic acids have properties that make these acids suitable for use as inhibitors of polymerization of polymerizable organic compounds the individual molecule of which contains the polymerizable grouping

for example polymerizable vinyl derivatives. These acids are destroyed readily by peroxides by heating slowly at 70° to 85° C. When destroyed by peroxide, or by heat alone, the color of the polymer is not affected.

In order that those skilled in the art better may understand how my invention is carried into effect, the following illustrative examples thereof are given:

Example 1

One-half per cent benzoyl peroxide was added to a commercial sample of monomeric methyl methacrylate containing about 0.1% pyrogallol and the monomer polymerized to solid state by heating at 70° C. at atmospheric pressure. The resulting polymer possessed a yellow cast.

Another sample was prepared by incorporating 0.1% isoascorbic acid and 0.5% benzoyl peroxide in monomeric methyl methacrylate. This sample was polymerized under the same conditions as the other sample. The hardening time in both cases was the same, but the isoascorbic acid inhibited methacrylate in polymeric state was much lighter in color than the pyrogallol-inhibited material.

(Note.—All percentages herein mentioned are by weight.)

Example 2

Samples were prepared as follows:

A. Monomeric methyl methacrylate containing about 0.1% pyrogallol inhibitor.

B. Non-inhibited monomeric methyl methacrylate.

C. Monomeric methyl methacrylate inhibited with 0.05% isoascorbic acid.

D. Monomeric methyl methacrylate inhibited with 0.1% isoascorbic acid. (Some isoascorbic acid was not in solution. Saturation occurs at a concentration of about 0.08%.)

E. Monomeric methyl methacrylate inhibited with 0.5% isoascorbic acid (saturated solution).

The above samples were heated at 70° to 75° C. at atmospheric pressure for varying periods of time and the effects noted.

After 24 hours' heating sample B (the non-inhibited material) had become converted to a solid mass. Samples A, C, D and E were in liquid state.

After 48 hours' heating, samples C, D and E were nearly hard, showing that the isoascorbic acid had decomposed. Sample A still remained as a thin liquid.

After 72 hours, samples C, D and E showed increasing hardness, E being softer than D, and D softer than C. Sample A remained in liquid state.

At the end of 96 hours, all samples except sample A were hard and colorless. Sample A was still a liquid and had a yellow cast.

Example 3

A sample of allyl methacrylate and a sample of allyl methacrylate saturated with isoascorbic acid were heated to 70° C. in an oven. The non-inhibited material became converted to a hard mass in 2 hours. The sample containing the isoascorbic acid was unaffected after 4 hours' heating.

Example 4

Samples of glycol methacrylate non-inhibited and inhibited by incorporating therewith about 0.08% isoascorbic acid were heated in an oven at about 70° C. The non-inhibited material polymerized to solid state in about 10 or 11 hours while the isoascorbic acid inhibited material was unchanged.

Example 5

A sample of methallyl methacrylate containing about 0.08% isoascorbic acid and a non-inhibited sample of the same material were heated in an oven at about 70° C. At the end of 16 hours the non-inhibited material had polymerized to solid state while the inhibited material was unchanged.

Example 6

Samples were prepared as follows:
A. Commercial copper-acetate stabilized vinyl acetate to which 0.5% benzoyl peroxide was added.
B. Commercial copper-acetate stabilized vinyl acetate.
C. Unstabilized (pure) vinyl acetate.
D. Vinyl acetate plus 0.1% ascorbic acid.
E. Vinyl acetate plus 0.5% benzoyl peroxide.
F. Vinyl acetate plus 0.1% ascorbic acid plus 0.5% benzoyl peroxide.

These samples were heated in an oven at about 70° C. After 100 minutes' heating, samples E and F polymerized to a clear, colorless gummy mass. After 24 hours, sample A became gummy and had a blue color, sample B was partly polymerized, sample C was more highly polymerized than sample B, and sample D was unchanged.

Example 7

The following samples of methyl methacrylate were prepared and exposed to direct sunlight in Pyrex glass at room temperature, which varied from 55° to 98° F.:
A. Commercially inhibited methyl methacrylate.
B. Commercially inhibited methyl methacrylate plus 0.5% benzoyl peroxide.
C. Non-inhibited (pure) methyl methacrylate.
D. Pure methyl methacrylate plus 0.5% isoascorbic acid.
E. Pure methyl methacrylate plus 0.1% isoascorbic acid.
F. Pure methyl methacrylate plus 0.05% isoascorbic acid.
G. Pure methyl methacrylate plus 0.1% isoascorbic acid plus 0.5% benzoyl peroxide.

After 7 days' exposure sample B was almost completely polymerized. After 9 days, sample C started to polymerize, sample G showed appreciable polymerization, while samples A, D, E and F were unchanged. After 10 days samples C and G were nearly wholly polymerized, and sample B was completely polymerized. After 13 days samples C and G were completely polymerized, samples E and F were partly polymerized, while samples A and D were unchanged. At the end of 20 days samples A and D were completely polymerized to solid state.

Other compounds that contain in the individual molecule a polymerizable

grouping and which may be inhibited against polymerization by practicing the present invention are compounds containing in the individual molecule a polymerizable acrylyl grouping (derived from acrylic acid), for instance acrylic and alphalkyl acrylic acids and esters of such acids as, for example, methyl, ethyl, propyl and butyl acrylates, ethyl, propyl and butyl methacrylates, methyl, ethyl, propyl and butyl ethacrylates, and the like. Vinyl compounds other than vinyl acetate also may be inhibited as herein described, for example vinyl benzene (styrene), vinyl propionate, vinyl butyrate, etc.

Ascorbic and isoascorbic acids are readily destroyed in situ by heat and by accelerators of polymerization such as organic peroxides, leaving colorless decomposition products in the polymerized material that need not be removed. Hence these acids, although not limited thereto, are particularly suitable for use in inhibiting the polymerization of liquid monomeric compounds which in polymeric state should be colorless. Ascorbic and isoascorbic acids also may be used to inhibit the polymerization of other compounds which polymerize under the influence of heat, light or oxygen-containing bodies and which comprise a polymerizable organic compound containing in its molecule the ploymerizable grouping

What I claim as new and desire to secure by Letters Patent of the United States is:

1. A composition which is polymerizable under the influence of heat, light or oxygen and which comprises a polymerizable organic compound containing in its molecule the polymerizable grouping

said compound having incorporated therein as an inhibitor of polymerization a member of the class consisting of ascorbic acid, isoascorbic acid, and mixtures of ascorbic and isoascorbic acids.

2. A polymerizable vinyl compound in which is incorporated as an inhibitor of polymerization a small amount of a member of the class consisting of ascorbic acid, isoascorbic acid, and mixtures of ascorbic and isoascorbic acids.

3. A polymerizable organic compound containing in its molecule a polymerizable acrylyl grouping, said compound having incorporated therein a member of the class consisting of ascorbic acid, isoascorbic acid, and mixtures of ascorbic and isoascorbic acids in an amount sufficient to inhibit the polymerization of the said organic compound.

4. A polymerizable ester of acrylic acid having incorporated therein a member of the class consisting of ascorbic acid, isoascorbic acid, and mixtures of ascorbic and isoascorbic acids in an amount sufficient to inhibit the polymerization of the said ester.

5. A polymerizable composition consisting of monomeric methyl methacrylate having incorporated therein isoascorbic acid in an amount sufficient to inhibit the polymerization of the said methacrylate.

6. A polymerizable composition consisting of a polymerizable ester of an alpha-alkyl acrylic acid having incorporated therein as an inhibitor of polymerization a small amount of a member of the class consisting of ascorbic acid, isoascorbic acid, and mixtures of ascorbic and isoascorbic acids.

7. A polymerizable composition consisting of polymerizable vinyl acetate having incorporated therein as an inhibitor of polymerization a small amount of a member of the class consisting of ascorbic acid, isoascorbic acid, and mixtures of ascorbic and isoascorbic acids.

8. A composition comprising a polymerizable organic compound containing in its molecule the polymerizable grouping

and, in addition to said compound, ascorbic acid in an amount sufficient to inhibit the polymerization of the said organic compound.

9. A composition comprising a polymerizable organic compound containing in its molecule the polymerizable grouping

and, in addition to said compound, isoascorbic acid in an amount sufficient to inhibit the polymerization of the said organic compound.

10. A polymerizable organic compound containing in its molecule the polymerizable grouping

said compound having incorporated therewith as an inhibitor of polymerization from 0.05 to 0.5 per cent by weight thereof of a member of the class consisting of ascorbic acid, isoascorbic acid and mixtures of ascorbic and isoascorbic acid.

GAETANO F. D'ALELIO.